US007179546B1

(12) United States Patent
Chen

(10) Patent No.: US 7,179,546 B1
(45) Date of Patent: Feb. 20, 2007

(54) DECORATIVE AND PROTECTIVE COATING

(75) Inventor: Guocon Chen, Broomfield, CO (US)

(73) Assignee: Vapor Technologies, Inc., Boulder, CO (US)

( * ) Notice: Subject to any disclaimer, the term of this patent is extended or adjusted under 35 U.S.C. 154(b) by 0 days.

(21) Appl. No.: 11/004,202

(22) Filed: Dec. 3, 2004

(51) Int. Cl.
*B32B 18/00* (2006.01)

(52) U.S. Cl. ...................... 428/698; 428/699; 428/701; 428/702

(58) Field of Classification Search ................ 428/698, 428/699, 701, 702
See application file for complete search history.

(56) References Cited

U.S. PATENT DOCUMENTS 4,101,703 A 7/1978 Schintlmeister
5,879,532 A 3/1999 Foster et al.
6,168,242 B1 1/2001 Mokerji
6,196,936 B1 3/2001 Meckel
6,399,219 B1 * 6/2002 Welty et al. ................ 428/626
6,743,532 B1 6/2004 Chen
2004/0142205 A1 * 7/2004 Chen et al. ................ 428/689
2004/0142213 A1 * 7/2004 Chen et al. ................ 428/701

* cited by examiner

*Primary Examiner*—Jennifer McNeil
*Assistant Examiner*—Gordon R. Baldwin
(74) *Attorney, Agent, or Firm*—Emch, Schaffer, Schaub & Porcello Co., L.P.A.

(57) ABSTRACT

An article is coated with a multi-layer coating having the appearance of brass, nickel and stainless steel. The coating comprises a nickel or polymer base coat on the surface of said article, a chromium layer and vapor deposited on the chromium layer, a refractory metal nitride or nitride and oxide, or refractory metal alloy nitride or nitride and oxide that mimic the colors of brass, nickel and stainless steel. An oxide-containing strike layer comprised of nano-sized refractory metal crystals and/or preferentially oriented refractory metal phase with the refractory oxide for precipitation hardening. A refractory oxide layer intermediate the refractory metal strike layer and the stack layer comprised of alternative layers of refractory metal, substoichiometric refractory nitride and stoichiometric refractory nitride. This intermediate oxide layer acts as a non-conductive barrier to improve corrosion and pitting resistance. An ultra-thin refractory oxide top layer to provide further protection against corrosion.

8 Claims, 4 Drawing Sheets

DECORATIVE AND PROTECTIVE COATING

FIELD OF THE INVENTION

This invention relates to articles having a multi-layered decorative and protective coating thereon.

BACKGROUND OF THE INVENTION

It is currently the practice with various brass articles such as lamps trivets, candlesticks, door knobs and handles and the like to first buff and polish the surface of the article to a high gloss and to then apply a protective organic coating, such as one comprised of acrylics, urethanes, epoxies, and the like, onto this polished surface. While this system is generally quite satisfactory it has the drawback that the buffing and polishing operation, particularly if the article is of a complex shape, is labor intensive. Also, the known organic coatings are not always as durable as desired, particularly in outdoor applications where the articles are exposed to the elements and ultraviolet radiation.

The problems with organic coatings have been overcome by the application of physical vapor deposited coatings. However, even with these coatings there is a problem with corrosion and pitting after an extended period of use in aggressive environment, such as tropical coastal areas. The present invention provides vapor deposited coatings which have improved corrosion resistance, reduced pitting and superior abrasion resistance.

SUMMARY OF THE INVENTION

The present invention is directed to an article, such as a plastic, ceramic or metallic article, having a multi-layer coating on at least a portion of its surface. More particularly, it is directed to an article or substrate, particularly a metallic article such as stainless steel, aluminum, brass or zinc, having deposited in at least a portion of its surface a coating comprised of multiple superposed layers of certain specific types of materials. The coating is decorative and also provides corrosion resistance, wear resistance, improved chemical resistance, and is smooth.

The article has deposited on its surface a basecoat layer. The basecoat layer is a nickel layer or a polymeric layer. The basecoat later functions to level the surface of the article, cover any scratches or imperfections in the surface of the article, provide a smooth and even surface for the deposition of the subsequent layers of the multi-layered coatings, and provide improved corrosion resistance.

In one embodiment over the basecoat layer is applied a metal, such as chromium, or metal alloy, such as tin-nickel alloy, layer. Over this chromium or metal alloy layer is applied a chromium, refractory metal or refractory metal alloy strike layer. In this strike layer, a low percentage of oxygen was added during deposition, forming a nano-structured and/or preferentially oriented refractory metal phase with the refractory oxide acting as precipitation hardening particles. For zirconium, the resulting metal phase exists either as amorphous to nano-sized crystals up to 50 nm or as preferentially oriented crystals dominantly in (112) direction and up to 80 nm in size, as determined by x-ray diffraction. A small percentage of zirconium oxide, ranging from 2 to 30 atomic percent, preferably in 5 to 25 atomic percent, functions as precipitation hardening. Over this strike layer is applied a chromium oxide, refractory metal oxide or refactory metal alloy oxide layer. Over this intermediate oxide layer, may or may not be applied a stack layer comprised of layers of chromium compound, refractory metal compound or refractory metal alloy compound alternating with layers comprised of chromium, refractory metal or refractory metal alloy compound. Over this stack layer or directly on the intermediate oxide layer, is applied a protective color layer comprised of a chromium compound, refractory metal compound or refractory metal alloy compound such as a nitride, oxide, oxynitride, carbide or carbonitride. Over the color layer is a thin chromium oxide, refractory metal oxide or refactory metal alloy oxide top layer.

Other objects and advantages of the present invention will become apparent to those skilled in the art upon a review of the following detailed description of the preferred embodiments and the accompanying drawings.

DESCRIPTION OF THE INVENTION

Figure 1:
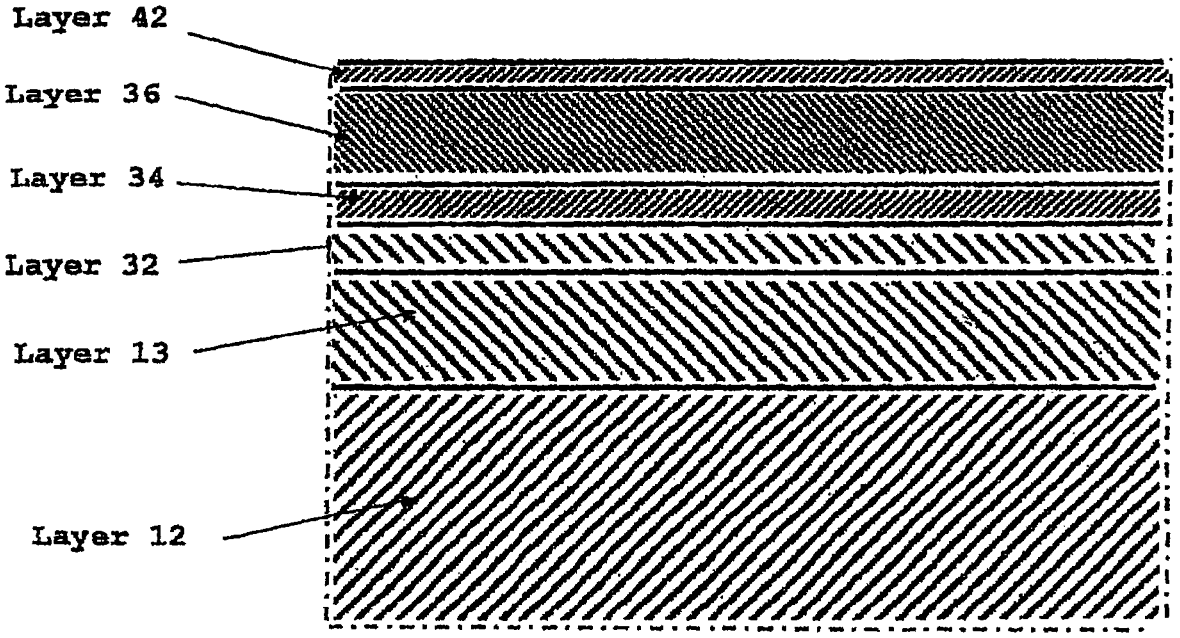
FIG. 1 is a cross-sectional view, not to scale, of the coated article of the instant invention wherein the coating comprises a basecoat layer, a strike layer containing a low percentage of oxygen, an intermediate oxide layer, a color layer and a top oxide layer.

The following describes FIGS. 1–4 in greater detail. Substrate 12 can be any material such as plastic, metal, metallic alloy or ceramic. Illustrative of metal and metal alloy substrates are copper, steel, brass, zinc, aluminum, tungsten, nickel alloys and the like. In preferred embodiments the substrate is brass or zinc.

Basecoat layer 13 is deposited on the surface of substrate 12 by conventional and well known processes. When basecoat layer 13 is nickel, the processes are conventional electroplating processes. These processes include using a conventional electroplating bath such as, for example, a Watts bath as the plating solution. Typically such baths contain nickel sulfate, nickel chloride and fluoroborate plating solutions can also be used. These baths can optionally include a number of well known and conventionally used compounds such as leveling agents, brighteners, and the like. To produce specularly bright nickel layer at least one brightener from class I and at least one brightener from class II is added to the plating solution. Class I brighteners are organic compounds which contain sulfur.

Class II brighteners are organic compounds which do not contain sulfur. Class II brighteners can also cause leveling and, when added to the plating bath without the sulfur-containing class I brighteners, result in semi-bright nickel deposits. These class I brighteners include alkyl naphthalene and benzene sulfonic acid. The benzene and naphthalene di- and trisulfonic acids, benzene and naphthalene sulfonamides, and sulfonamides such as saccharin, vinyl and allyl sufonamides and sulfonic acids. The class II brighteners generally are unsaturated organic materials such as, for example, acetylenic or ethylenic alcohols, ethoxylated and propoxylated acetylenic alcohols, coumarins, and aldehydes. These class I and class II brighteners are well known to those skilled in the art and are readily commercially available. They are described, inter alia, in U.S. Pat. No. 4,421,611 incorporated herein by reference.

Nickel layer 13 can be comprised of a single nickel layer such as, for example, bright nickel, or it can be comprised of two different nickel layers such as, for example, a semi-bright nickel layer and a bright nickel layer. This duplex nickel deposit provides improved corrosion protection to the underlying substrate and provides leveling. Semi-bright, sulfur free plate is deposited by conventional electroplating processes directly on the surface of substrate 12. Substrate 12 containing semi-bright nickel layer is then plated in a bright nickel plating bath and a bright nickel layer is deposited on semi-bright nickel layer, also by conventional electroplating processes.

The thickness of nickel layer 13 is generally a thickness which is (i) effective to provide improved corrosion protection to the substrate, and (ii) provide leveling of the substrate. This thickness is generally in the range of from at least about 2.5 μm, preferably from at least about 4 μm to about 90 μm.

In the embodiment where a duplex nickel layer is used, the thickness of the semi-bright nickel layer and the bright nickel layer is a thickness effective to provide improved corrosion protection Generally, the thickness of the semi-bright nickel layer is at least about 0.1 μm, preferably at least about 2.5 μm, and more preferably at least about 3.5 μm. The upper thickness limit is generally not critical and is governed by secondary considerations such as cost and appearance. Generally, however, a thickness of about 50 μm, preferably about 30 μm, and more preferably 20 μm should not be exceeded. The bright nickel layer generally has a thickness of at least about 1 μm, preferably at least about 3 μm, and more preferably at least about 6 μm. The upper thickness range of the bright nickel layer is not critical and is generally controlled by considerations such as cost. Generally, however, a thickness of about 60 μm, preferably about 50 μm, and more preferably about 40 μm should not be exceeded. The bright nickel layer, in particular, also functions as a leveling layer which tends to cover or fill in surface imperfections in the substrate.

In another embodiment a basecoat layer 13 is a polymeric material Polymeric or resinous basecoat 13 may be comprised of both thermoplastic and thermoset polymeric or resinous material. These polymeric or resinous materials include the well known, conventional and commercially available polyacrylates, polymethacrylates, polyepoxies, alkyds, polyurethanes, and styrene containing polymers such as polystyrene and styrene-acrylonitrile (SAN), and blends and copolymers thereof.

The polyacrylates and polymethacrylates are polymers or resins resulting from the polymerization of one or more acrylates such as, for example, methyl acrylate, ethyl acrylate, butyl acrylate, 2-ethylhexyl acrylate, etc., as well as the methacrylates such as, for instance, methyl methacrylate, ethy methacrylate, butyl methacrylate, hexyl methacrylate, etc. Copolymers of the above acrylate and methacrylate monomers are also included within the term "polyacrylates or polymethacrylates" as it appears herein. The polymerization of the monomeric acylates and methacrylates to provide the polyacrylate resins useful in the practice of the invention may be accomplished by any of the well known polymerization techniques.

The styrene-acrylonotrile resins and their preparation are disclosed, inter alia, in U.S. Pat. Nos. 2,769,804; 2,989,517; 2,739,142; 3,935,152 and 4,291,134, all of which are incorporated herein by reference.

The alkyd resins are disclosed in "Alkyd Resin Technology", Patton, Interscience Publishers, NY, N.Y., 1962, and in U.S. Pat. Nos. 3,102,866; 3,228,787 and 4,511,692, all of which are incorporated herein by reference.

Polyurethanes are well known in the art and are readily commercially available. Various known polyols and polyisocyanates are used to form polyurethanes. Polyurethanes are described, for example, in Chapter X, Coatings, pp. 453–607 in J. H. Saunders and K. C. Frisch, Polyurethanes: Chemistry and Technology, Part II, Interscience Publishers (NY, 1964), incorporated herein by reference.

Suitable polyurethanes may be prepared in a conventional manner such as by reacting polyols or hydroxylated polymers with organic polyisocyanates in the manner well known in the art. Suitable organic polyisocyanates include, for instance, ethyl diisocyanate; ethylidene diisocyanate; propylene-1,2-diisocyanate; cyclohexylene-1,2-diisocyanate; m-phenylene diisocyanate; 2,4-toluene diisocyanate; 2,6-toluene diisocyanate; 3.3'-dimethyl-4,4'-biphenyl diisocyanate; p,p',p"-triphenylmethane triisoene diisocyanate; 3,3'-diphenyl-4,r'-biphenylene diisocyanate; 4,4'-byphenylene diisocyanate; 3.3'-dichloro-4,4-biphenylene diisocyanate; p,p',p"-tripphenylmethane triisocyanate; 1,5-meptha-lene diisocyanate; furfurylidene diisocyanate or polyisocyanates, in blocked or inactive form such as bis-phenyl carbamates or 2,4- or 2,6-toluene diisocoyanate; p.p"-diphenyl methane diisocyanate; p-phenylene diisocyanate, 1,5-napthalene diisocyanate and the like. It is preferred to use a commercially available mixture of toluene diisocyanates which contains 80 percent, 2,4-toulene diisocoyanate and 20 percent 2,6-toluene diisocyanate or 4,4-diphenylmethane diisocyanate.

Polyurethanes applied as base coats in accordance with the invention may, of course, be in the form of solutions in suitable solvents such as xylene, toluene, methyl ethyl ketone, butanol, butyl acetate, etc.

Materials for the polyurethane base coats may be supplied on one package or two package prepolymer systems or oil modified systems, etc., all in the manner well known in the industry. Such materials are described for instance in the pamphlet "Urethane Coatings", published by the Federation of Societies for Paint Technology (1970). Radiation-curable urethane coatings may also of course be used.

Some illustrative examples of suitable polyurethane compositions are disclosed in U.S. Pat. Nos. 4,699,814; 4,681,811; 4,703,101; 4,403,003 and 5,268,215, all of which are incorporated herein by reference.

The polyepoxies are disclosed in "Epoxy Resins", by H. Lee and K. Nevill, McGraw-Hill, New York, 1957, and in U.S. Pat. Nos. 2,633,458; 4,988,572; 4,734,468; 4,680,076; 4,933,429 and 4,999,388, all of which are incorporated herein by reference.

Some suitable epoxy resins include glycidyl ethers of polyhydric phenols and polyhydric alcohols prepared by the reaction of epichlorohydrin with a compound containing at least one hydroxyl group, such as for example bisphenol-A, carried out under alkaline reaction conditions.

Other suitable epoxy resins can be prepared by the reaction of epichlorohydrin with mononuclear di-and trihydroxy phenolic compound such as resorcinol and phloroglucinol, selected polynuclear polyhydroxy phenolic compounds such as bis (phydroxphenyl) methane and 4,4'-dihydroxybiphenyl, or aliphatic polyols such as 1,4-butanediol and glycerol.

These epoxy resins include the glycidyl polyethers of polyhydric phenols and polyhydric alcohols, particularly the glycidyl polyethers or 2,2-bis (4-hydroxyphenyl) propane.

These polymeric materials may optionally contain the conventional and well known fillers such as mica, talc and glass fibers.

Polymeric basecoat layer 13 is applied onto substrate 12 by any of the well known and conventional methods such as dipping, spraying, brushing, electrostatic spraying and electrocoating.

Layer 13 functions, to level the surface of the substrate, cover any scratches or imperfections in the surface, provide a smooth and even surface for the deposition of the subsequent layers, and provide corrosion resistance to the substrate.

Polymeric basecoating layer 13 has a dry or cured thickness at least effective to provide corrosion resistance and to level out the surface of the substrate. Generally this thickness is from about 2 μm to about 300 μm, preferably from about 5 μm to about 150 μm, and more preferably from about 7 μm to about 35 μm.

Figure 3:
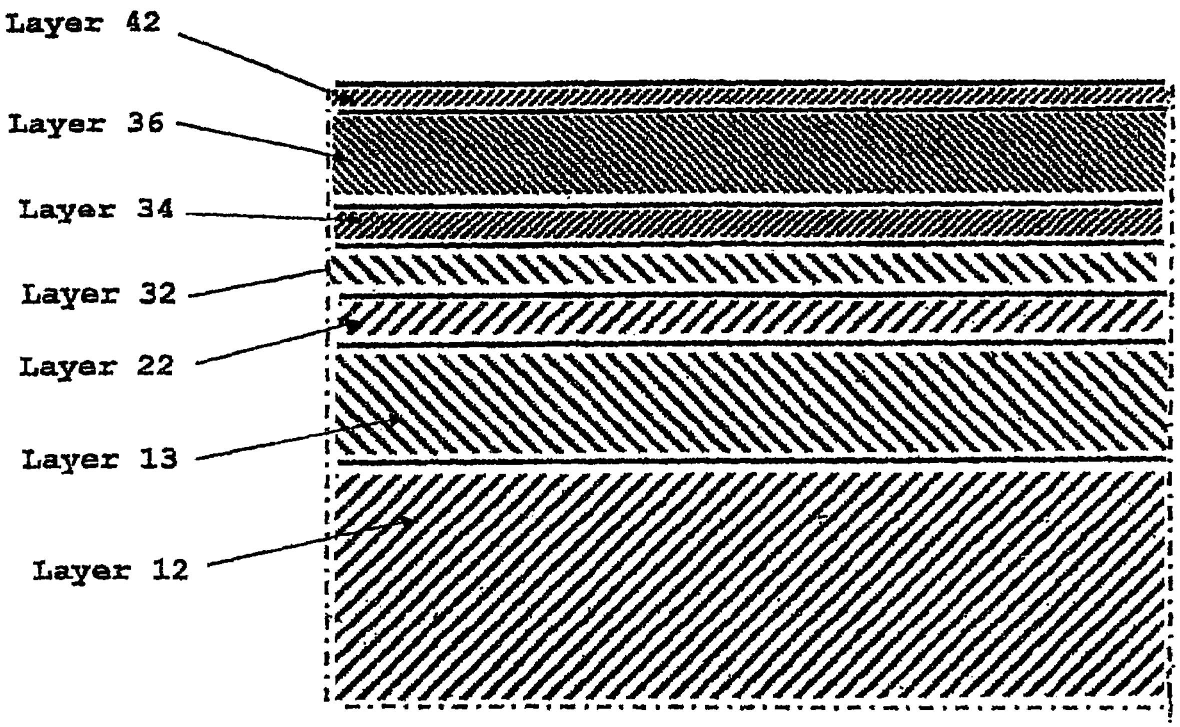
FIG. 3 is similar to FIG. 1 except that a chromium layer is present intermediate the basecoat layer and the strike layer.

In one embodiment, as illustrated in FIG. 3, deposited over layer 13, is layer 22 comprised of chrome. Chrome layer 22 may be deposited on layer 13 by plating or vapor deposition such as physical vapor deposition. Plating includes electroplating. The chrome electroplating techniques along with various chrome plating baths are well known and conventional and are disclosed, inter alia, in Brassard, “Decorative Electroplating—A Process in Transition”, Metal Finishing, pp. 105–108, June 1988; Zaki, “Chromium Plating”, PF Directory, pp. 146–160; and in U.S. Pat. Nos. 4,460,438; 4,234,396 and 4,093,522, all of which are incorporated herein by reference.

Chrome plating baths are well known and commercially available. A typical chrome plating bath contains chromic acid or sales thereof, and catalyst ion such as sulfate or fluoride. The catalyst ions can be provided by sulfuric acid or its salts and fluosilicic acid. The baths may be operated at a temperature of about 112°–116° F. Typically in chrome plating a current density of about 150 amps per square foot, at about 5 to 9 volts is utilized.

Chrome layer 22 serves to provide structural integrity of the coating or reduce or eliminate plastic deformation of the coating. Basecoat layer 13 is relatively soft compared to the refractory metal compound layer. Thus, an object impinging on, striking or pressing on layer 26 will not penetrate this relatively hard layer, but this force will be transferred to the relatively soft underlying basecoat layer 13 causing plastic deformation of this layer. Chrome layer 22, being relatively harder than basecoat layer 13, will generally resist the plastic deformation that layer 13 would experience in the absence of chrome layer 22.

Chrome layer 22 has a thickness at least effective to provide structural integrity to and reduce plastic deformation of the coating. This thickness is at least about 0.05 μm, preferably at lest about 0.1 μm, and more preferably at least about 0.2 μm. Generally, the upper range of thickness is not critical and is determined by secondary considerations such as cost. However, the thickness of the chrome layer should generally not exceed about 5 μm, preferably about 2 μm, and more preferably about 1 μm.

Instead of layer 22 being comprised of chrome it may be comprised of tin-nickel alloy, palladium-nickel alloy or nickel-tungsten-boron alloy.

The tin-nickel layer may be deposited by plating such as electroplating or vapor deposition such as physical vapor deposition. If the tin-nickel layer is deposited by electroplating it is deposited by conventional and well known tin-nickel electroplating processes. These processes and plating baths are described, inter alia, in U.S. Pat. Nos. 4,033,835; 4,049,508; 3,887,444; 3,772,168 and 3,940,319, all of which are incorporated herein by reference.

The tin-nickel alloy layer is preferably comprised of about 60–70 weight percent tin and about 30–40 weight percent nickel, more preferably about 65% tin and 35% nickel reprising the atomic composition SnNi. The plating bath contains sufficient amounts of nickel and tin to provide a tin-nickel alloy of the afore-described composition.

A commercially available tin-nickel plating process is the Ni-Colloy™ process available from ATOTECH, and described in their Technical Information Sheet No: NiColloy, Oct. 30, 1994, incorporated herein by reference.

The nickel-tungsten-boron alloy layer may be deposited by plating such as electroplating or vapor deposition such as physical vapor deposition. If the nickel-tungsten-boron alloy layer is deposited by electroplating, it is deposited by conventional and well known nickel-tungsten-boron electroplating processes. The plating bath is normally operated at a temperature of about 115° to 125° F. and a preferred pH range of about 8.2 to about 8.6. The well known soluble, preferably water soluble, salts of nickel, tungsten and boron are utilized in the plating bath or solution to provide concentrations of nickel, tungsten and boron.

The amorphous nickel-tungsten-boron alloy layer generally contains at least 50, preferably at least about 55, and more preferably at least 57.5 weight percent nickel, at lest about 30, preferably at least about 35, and more preferably at least 37.5 weight percent tungsten, and at least about 0.05, preferably at least about 0.5, and more preferably at least about 0.75 weight percent boron. Generally the amount of nickel does not exceed about 70, preferably about 65, and more preferably about 62.5 weight percent, the amount of tungsten does not exceed about 50, preferably about 45, and more preferably about 42.5 weight percent, and the amount of boron does not exceed about 2.5, preferably about 2, and more preferably about 1.25 weight percent. The plating bath contains sufficient amounts of the salts, preferably soluble salts, of nickel, tungsten and boron to provide a nickel-tungsten-boron alloy of the afore-described composition.

A nickel-tungsten-boron plating bath effective to provide a nickel-tungsten-boron alloy of which a composition is commercially available, such as the Amplate™ system from Amorphous Technologies International of Laguna Niguel, Calif. A typical nickel-tungsten-boron alloy contains about 59.5 weight percent nickel, about 39.5 weight percent tungsten, and about 1% boron. The nickel-tungsten-boron alloy is an amorphous/nano-crystalline composite alloy. Such an alloy layer is deposited by the AMPLATE plating process marketed by Amorphous Technologies International.

The palladium-nickel alloy layer may be deposited by plating such as electroplating or vapor deposition such as physical vapor deposition. If the palladium-nickel electroplating process. Generally, they include the use of palladium slats or complexes such as nickel amine sulfate, organic brighteners, and the like. Some illustrative examples of palladium/nickel electroplating processes and baths are described in U.S. Pat. Nos. 4,849,303; 4,463,660; 4,416,748; 4,428,820 and 4,699,697, all of which are incorporated by reference.

The weight ratio is palladium to nickel in the palladium/nickel alloy is dependent, inter alia, on the concentration of palladium (in the form of its salt) in the plating bath. The higher the palladium slat concentration or ratio relative to the nickel salt concentration in the bath the higher the palladium ratio in the palladium/nickel alloy.

The palladium/nickel alloy layer generally has a weight ratio of palladium to nickel of from about 50:50 to about 95:5, preferably from about 60:40 to about 90:10, and more preferably from about 70:30 to about 85:15.

Figure 2:
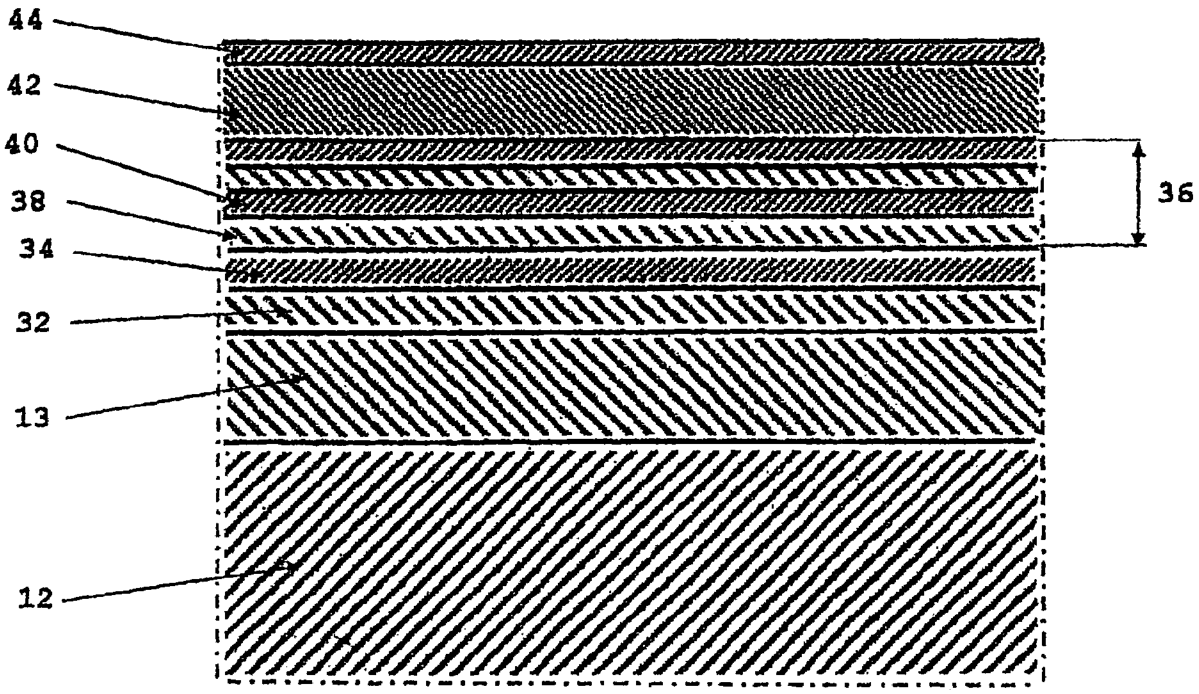
FIG. 2 is a cross-sectional view, not to scale, of the coated article of the instant invention wherein the coating comprises a basecoat layer, a strike layer containing a low percentage of oxygen, an intermediate oxide layer, a stack layer comprised of alternative layers of a refractory metal and substiochiometric refractory nitride layer and a refractory nitride layer, a color layer and a top oxide layer.

Over layer 22, if present, otherwise over basecoat layer 13 in the embodiment where layer 22 is not present as illustrated in FIGS. 1 and 2. is disposed layer 32 comprised of chromium, a refractory metal or a refractory metal alloy such as hafnium, tantalum, zirconium, titanium or zirconium-titanium alloy, preferably zirconium, titanium or zirconium-titanium alloy, and more preferably zirconium or zirconium-titanium alloy. A low percentage of oxygen was added during deposition, leading to formation of the nano-crystal size or preferentially oriented refractory metal phase with 2 to 30 atomic percent of amorphous refractory oxide particles, preferably between 5 to 25 atomic percent, acting for precipitation hardening.

Layer 32 is deposited by conventional and well known techniques including electrodeposition and vapor deposition techniques such as cathodic arc evaporation (CAE) or sputtering, and the like. Sputtering and CAE techniques and equipment are disclosed, inter alia, in J. Ossen and W. Kern "Thin Film Processes II", Academic Press, 1991; R. Boxman et al. "Handbook of Vacuum Arc Science and Technology", Noyes Pub., 1995; and U.S. Pat. Nos. 4,162,954 and 4,591,418, all of which are incorporated herein by reference.

Briefly, in the sputtering deposition process a chrome or refractory metal (such as titanium or zirconium) target, which is the cathode, and the substrate are placed in a vacuum chamber. The air in the chamber is evacuated to produce vacuum conditions in the chamber. An inert gas, such as Argon, is introduced into the chamber. The gas particles are ionized and are accelerated to the target to dislodge titanium or zirconium atoms. The dislodged target material is then typically deposited as a coating film on the substrate.

In cathodic arc evaporation, an electric arc of typically several hundred amperes is struck on the surface of a metal cathode such as zirconium or titanium. The arc vaporizes the cathode material, which then condenses on the substrates forming a coating. The arc vaporizes the cathode material, which then condenses on the substrates forming a coating. When CAE is used, adding a low percentage of oxygen deposition also has the effect of reducing the number of macroparticles and thus rendering a dense incipient PVD layer with fewer defects.

Layer 32 has a thickness which is generally at least effective to function as a strike layer and improve the adhesion of the stack layer 36 and color layer 42 to the underlying layer(s). This thickness is generally at least about 50 Å, preferably at least about 120 Å, and more preferably at least about 250 Å. The upper thickness range is not critical and is generally dependent upon secondary consideration such as cost. Generally, however, layer 32 should not be thicker than about 1.5μ, preferably about 0.5 μm, and more preferably about 0.25 μm. When CAE is used, adding a low percentage of oxygen deposition also has the effect of reducing the number of macroparticles and thus rendering a dense incipient PVD layer with fewer defects. For zirconium, the resulting metal phase exists either as amorphous to nano-size crystals up to 50 nm or as preferentially oriented crystals dominantly in (112) direction and up to 80 nm in size, as determined by x-ray diffraction. A small percentage of zirconium oxide, ranging from 2 to 30 atomic percent, preferably in 5 to 25 atomic percent, functions as precipitation hardening.

In a preferred embodiment of the present invention, layer 32 is comprised of titanium, zirconium or zirconium-titanium alloy, preferably zirconium or zirconium-titanium alloy, and is deposited by sputtering or cathodic arc evaporation.

Stack layer 36 is comprised of layers 38 of chromium compound, refractory metal compound or refractory metal compound alternating with layer 40 of chromium, refractory metal or refractory metal alloy. The chromium compound, refractory metal compound and refractory metal alloy compound are the nitrides, carbides and carbonitrides, e.g. chromium nitride, chromium carbides, zirconium carbonitride, titanium nitride and zirconium-titanium alloy carbonitride.

Stack layer 36 generally has an average thickness of from about 1,000 Å to about 1 μm, preferably from about 0.1 μm to about 0.9 μm, and more preferably from about 0.15 μm to 0.75 μm. The stack layer generally contains from about 2 to about 100 alternating layers 28 and 30, preferably from about 4 to about 50 alternating layers 28 and 30.

Each of layers 38 and 40 generally has a thickness of at least about 25 Å, preferably at least about 50 Å, and more preferably at least about 100 Å. Generally, layer 38 and 40 should not be thicker than about 0.38 μm, preferably about 0.25 μm, and more preferably about 0.1 μm.

A method of forming stack layer 36 is by utilizing sputtering or cathodic arc evaporation to deposit layer 32 of refractory metal such as zirconium or titanium followed by reactive sputtering or reactive cathodic arc evaporation to deposit layer 42 of, e.g., refractory metal nitrogen containing compound such as zirconium nitride or titanium nitride.

Preferably the flow rate of reactive gas such as nitrogen gas is varied (pulsed) during vapor deposition such as reactive sputtering between zero (no reactive gas is introduced) to the introduction of gas at a desired value to form multiple alternating layers of metal 38 and metal nitrogen containing compound 40 in sandwich layer 36.

Over layer 32 is deposited intermediate oxide layer 34 comprised of chromium, refractory metal or refractory metal alloy, a chromium oxide, refractory metal oxide or refractory metal alloy oxide. Oxide layer 34 functions, inter alia, to improve corrosion resistance, reduce pitting, and acts as a non-conductive barrier free of macroparticles.

Reactive physical vapor deposition such as reactive cathodic arc evaporation and reactive sputtering are generally similar to ordinary sputtering and cathodic arc evaporation except that a reactive gas is introduced into the chamber which reacts with the dislodged target material. Thus, in the case where zirconium oxide is layer 34, the cathode is comprised of zirconium, and oxygen is the reactive gas introduced into the chamber.

The thickness of oxide layer 34 is a thickness effective to improve corrosion resistance, reduce pitting, and acts as a non-conductive barrier layer free of macroparticles. This thickness if from about 50 to about 800 Å, preferably form about 100 to about 300 Å. If the oxide layer is thinner than about 50 Å there is little, if any, barrier effect on improvement in corrosion resistance and reduction of pitting.

Preferably oxide layer 34 contains a stoichiometric amount of oxygen. It is to be understood that oxide layer 34 can in general, contain a substoichiometric amount of oxygen, e.g., 2–67 atomic percent.

Over stack layer 36 is deposited, by reactive vapor deposition such as reactive physical vapor deposition, a protective and decorative color layer 42 comprised of a chromium compound, refractory metal compound or refractory metal alloy compound. The chromium compounds, refractory metal compound and refractory metal alloy compounds include the nitrides, carbides and carbonitrides.

Some illustrative, non-limiting examples of these compounds include chromium nitride, chromium carbide, zirconium nitride, oxide, oxynitride, carbide and carbonitride, titanium nitride, oxynitride, hafnium nitride, and oxynitride, carbide, zirconium-titanium alloy carbide, zirconium nitride and titanium carbonitride.

Layer 42 provides wear and abrasion resistance and the desired color or appearance. Layer 42 is deposited on layer 36 by any of the well known and conventional vapor deposition techniques, for example physical vapor deposition techniques such as reactive sputtering and cathodic arc evaporation.

Layer 42 has a thickness at least effective to provide wear and abrasion resistance and the desired color or appearance. Generally, this thickness is at least about 1,000 Å, and more preferably at least about 2,500 Å. The upper thickness range is generally not critical and is dependent upon secondary considerations such as cost. Generally a thickness of about 1 μm, and preferably about 0.5 μm should not be exceeded.

Over color layer 42 is oxide top layer 44. Oxide top layer 44 is comprised of chromium oxide and refractory metal oxides or refractory metal alloy oxides. The refractory metal oxides and refractory metal alloy oxides of which layer 44 is comprised include, but are not limited to, hafnium oxide, tantalum oxide, zirconium oxide, titanium oxide, and zirconium-titanium alloy oxide.

Layer 44 generally provides improved chemical resistance and is necessary for layer 32 and layer 34 to function effectively. If absent, layer 32 and layer 34 will probably not provide sufficiently improved corrosion and pitting resistance. Layer 44 is generally thin enough to be transparent or translucent so that the color of color layer 42 can be seen through layer 44, but thick enough to provide improved chemical resistance. Generally, this thickness is at lest about 1 nm, preferably at least about 5 nm. The thickness should generally not be greater than about 50 nm, preferably not greater than about 25 nm in order to avoid changing the color of color layer 42 or producing interference reflections.

Figure 4:
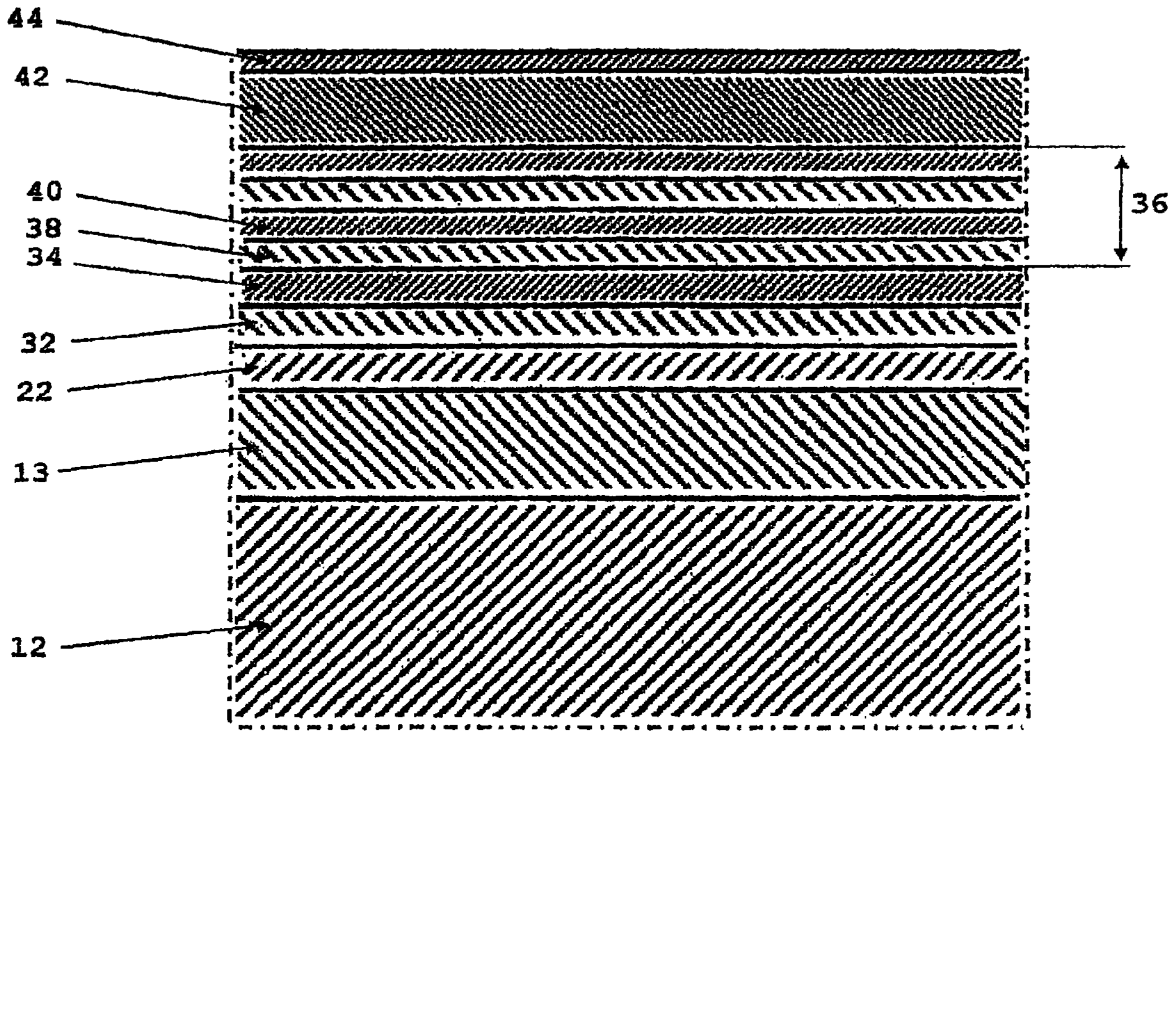
FIG. 4 is similar to FIG. 2 except that a chromium layer is present intermediate the basecoat layer and the strike layer.

FIG. 4 is similar to FIG. 2 except that a chromium layer is present intermediate the basecoat layer and the strike layer. The embodiment of FIG. 4 has the following construction:

Layer 12: Substrate.

Layer 13: Polymeric basecoat.

Layer 22: Chromium layer.

Layer 32: Strike (refractory metal) layer.

Layer 34: Intermediate refractory metal oxide layer.

Layer 36: Stack layer (mixture of alternative layers of refractory metal, and substoichiometric refractory nitride layer (38) and refractory nitride layer (40).

Layer 42: refractory nitride color layer.

Layer 44: ultra-thin refractory oxide layer.

In order that the invention may be more readily understood the following example is provided. The example is illustrative and does not limit the invention thereto.

EXAMPLE 1

Brass door handles are placed in a conventional soak cleaner bath containing the standard and well known soaps, detergents, defloculants and the like which is maintained at a pH of 8.9–9.2 and a temperature of 180–200° F. for about 10 minutes. The brass door handles are then placed in a conventional ultrasonic alkaline cleaner bath. The ultrasonic cleaner bath has a pH of 8.9–9.2, is maintained at a temperature of about 160–180° F., and contains the conventional and well known soaps, detergents, defloculants and the like. After the ultrasonic cleaning the door handles are rinsed and placed in a conventional alkaline electro cleaner bath. The electro cleaner bath is maintained at a temperature of about 140–180° F., a pH of about 10.5–11.5, and contains standard and conventional detergents. The door handles are then rinsed twice and placed in a conventional acid activator bath. The acid activator bath has a pH of about 2.0–3.0, is at an ambient temperature, and contains a sodium fluoride based acid salt. The door handles are then rinsed twice and placed in a bright nickel plating bath for about 12 minutes. The bright nickel bath is generally a conventional bath which is maintained at a temperature of about 130–150°, a pH of about 4.0, contains $NiSO_4$, $NiCl_2$, boric acid, and brighteners. A bright nickel layer of an average thickness of about 10 μm is deposited on the faucet surface. The bright nickel plated door handles are rinsed three times and then placed in a conventional, commercially available hexavalent chromium plating bath using conventional chromium plating equipment for about seven minutes.

The hexavalent chromium bath is a conventional and well known bath which contains about 32 ounces/gallon of chromic acid. The bath also contains the conventional and well known chromium plating additives. The bath is maintained at a temperature of about 112°–116° F., and utilizes a mixed sulfate/fluoride catalyst. The chromic acid to sulfate ratio is about 200:1. A chromium layer of about 0.25 μm is deposited on the surface of the bright nickel layer. The door handles are thoroughly rinsed in deionized water and then dried.

The chromium plated door handles are placed in a cathodic arc evaporation plating vessel. The vessel is generally a cylindrical enclosure containing a vacuum chamber which is adapted to be evacuated by means of pumps. A source of argon gas is connected to the chamber by an adjustable valve for varying the rate of flow of argon into the chamber. In addition, sources of nitrogen and oxygen gases are connected to the chamber by adjustable valves for varying the flow rates of nitrogen and oxygen into the chamber.

A cylindrical cathode is mounted in the center of the chamber and connected to negative outputs of a variable D.C. power supply. The positive side of the power supply is connected to the chamber wall. The cathode material comprises zirconium.

The plated door handles are mounted on spindles, 16 of which are mounted on a ring around the outside of the cathode. The entire ring rotates around the cathode while each spindle also rotates around its own axis, resulting in a so-called planetary motion which provides uniform exposure to the cathode for the multiple door handles mounted around each spindle. The ring typically rotates at several rpm, while each spindle makes several revolutions per ring revolution. The spindles are electrically isolated from the chamber and provided with rotatable contacts so that a bias voltage may be applied to the substrates during coating.

The vacuum chamber is evacuated to a pressure of about $10^{-5}$ to about $10^{-7}$ torr and heated to about 150° C.

The electroplated door handles are then subjected to a high-bias arc plasma cleaning in which a (negative) bias voltage of down to −600 volts is applied to the electroplated door handles while an arc of approximately 500 amperes is struck and sustained on the cathode. In addition to argon gas, a low percentage of oxygen is introduced into the vacuum chamber, range from 5 to 30 percent of the total gas flow. This low percentage of oxygen helps remove residual hydrocarbon contaminants from the plated surfaces and reduces the number of macroparticles when a very thin layer of the target material is deposited. The duration of the cleaning is approximately five minutes.

Argon gas is introduced at a rate sufficient to maintain a pressure of about 1 to 5 millitorr, with which a small oxygen flow is introduced into the vacuum chamber, about 15% to 20% of the total gas flow. A layer of zirconium having an average thickness of about 0.1 μm is deposited on the chrome plated door handles during a three minute period. The cathodic arc deposition process comprises applying D.C. power to the cathode to achieve a current flow of about 500 amps, introducing argon gas into the vessel to maintain the pressure in the vessel at about 1 to 5 millitorr and rotating the door handles in a planetary fashion described above. With addition of such a percentage of oxygen, the resulting zirconium metal phase exists either as amorphous to nano-sized crystals up to 50 nm or as preferentially oriented crystals dominantly in (112) direction and up to 80 nm in size, as determined by x-ray diffraction. A small percentage of zirconium oxide, ranging from 2 to 30 atomic percent, preferably in 5 to 15 atomic percent, functions as precipitation hardening.

After the oxide-containing zirconium layer is deposited, a non-conductive zirconium oxide barrier layer is deposited on the zirconium metal layer. A flow of oxygen is introduced into the vacuum chamber while the arc discharge is maintained at a designated current value for 5 minutes. The flow ratio of oxygen to argon should be maintained such that a stable arc plasma is maintained while no charging builds up on the target surface that prevents further formation of plasma, and a stoichiometric zirconium oxide barrier layer is deposited. Normally, this zirconium oxide layer is preferably between 100 Å to 300 Å thick to act as an efficient non-conductive barrier layer to improve corrosion and pitting resistance.

On the top the zirconium oxide layer, a stack of alternative layers of a zirzirconium metal and substoichimetric zirconium nitride layer and a stoichiometric zirzirconium nitride layer is deposited. A flow of nitrogen is introduced into the chamber and varied such that a thin layer of zirconium metal and substoichimetric zirzirconium nitride layer is produced when the nitrogen flow is decreased and a thin layer of stoichimetric zirconium nitride is produced when the nitrogen flow is sufficient.

On the stack layers of alternative mixture of zirconium metal and substoichimetric zirzirconium nitride layer and stoichiometric layer, a zirconium nitride, substoichchimetric nitride and oxyntride color is deposited. A flow of nitrogen or nitrogen and oxygen is introduced into the vacuum chamber while the arc discharge continues at approximately 500 amperes. In production of a brass color zirconium nitride, the flow of nitrogen is a flow which will produce zirconium nitride layer having nitrogen content of about 35 to 50 atomic percent. In production of nickel or stainless steel color, substoichiometric zirconium nitride or zirconium oxynitride when flow of nitrogen and oxygen results in total nitrogen and oxygen content of 14 to 35 atomic percent in the zirconium nitride and oxide layer. The zirconium nitride or nitride and oxide color layer having a thickness of about 1,500 to 7,500 Å.

After this color layer is deposited the nitrogen flow is terminated and a flow of oxygen of approximately 30 to 70 standard liters per minute is introduced for a time of about 10 to 60 seconds. A thin layer of zirconium oxide with a thickness of about 10 to 100 Å is formed. The arc is extinguished, the vacuum chamber is vented and the coated articles removed.

EXAMPLE II

This example uses a polymeric basecoat layer instead of the nickel basecoat layer of Example I. Otherwise, the process of Example I was followed.

Brass door handles are placed in a conventional soak cleaner bath containing the standard and well known soaps, detergents, defloculants and the like which is maintained at a pH of 8.9–9.2 and a temperature of 180–200° F. for about 10 minutes. The brass door handles are then placed in a conventional ultrasonic alkaline cleaner bath. The ultrasonic cleaner bath has a pH of 8.9–9.2, is maintained at a temperature of about 160–180° F., and contains the conventional and well known soaps, detergents, defloculants and the like. After the ultrasonic cleaning the handles are rinsed and dried.

A basecoat polymeric composition is applied onto the cleaned and dried handles by a standard and conventional high volume low pressure gun. The polymer is comprised of 35 weight percent styrenated acrylic resin, 30 weight percent melamine formaldehyde resin, and 35 weight percent bisophenol A epoxy resin. The polymer is dissolved in sufficient solvents to provide a polymeric composition containing about 43 weight percent solids. After the basecoat is applied onto the handles, the handles are allowed to sit for 20 minutes for ambient solvent flash off. The handles are then baked at 375° F. for two hours. The resulting cured polymeric basecoat has a thickness of about 20 μm.

The door handles with the polymeric base coat are placed in a conventional, commercially available hexavalent chromium plating bath using conventional chromium plating equipment for about seven minutes. The remainder of this Example is the same as Example I.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. An article having on at least a portion of its surface a multi-layer coating having the appearance of brass, nickel and stainless steel comprising:

a basecoat layer;

an oxide containing strike layer comprised of a refractory metal and a low percentage of refractory oxide rendering a nano-size refractory metal crystals or oriented refractory metal phase with the refractory oxide acting as precipitation hardening particles;

a chrome layer intermediate the basecoat layer and the oxide strike layer;

a stack layer comprised of alternative layers of refractory metal, substoichimetric refractory nitride and stoichiometric refractory nitride;

an intermediate refractory oxide layer between the oxide strike layer and the stack layer; and a refractory nitride color layer.

2. An article according to claim 1 wherein the basecoat layer is a nickel layer.

3. An article according to claim 1 wherein the basecoat layer is a polymer layer.

4. An article according to claim 1 including an ultra-thin refractory oxide top layer on top of the color layer.

5. An article according to claim 1 wherein the stack layer is alternatively mixed with a layer of zirconium metal and substoichiometric zirconium nitride and a layer stoichiometric zirconium nitride.

6. An article according to claim 1 wherein oxide-containing strike layer contains nano-sized refractory metal crystals or preferentially oriented refractory metal phase with 2 to 30 atomic percent of the refractory oxide.

7. An article according to claim 1 wherein the intermediate oxide layer is a stoichiometric oxide or substoichiometric oxide having an oxygen content between 2 to 67 atomic percent.

8. An article according to claim 5 wherein the ultrathin refractory oxide top layer provides corrosion and pitting resistance.

* * * * *

UNITED STATES PATENT AND TRADEMARK OFFICE

CERTIFICATE OF CORRECTION

PATENT NO. : 7,179,546 B1 Page 1 of 1
APPLICATION NO. : 11/004202
DATED : February 20, 2006
INVENTOR(S) : Guocon Chen It is certified that error appears in the above-identified patent and that said Letters Patent is hereby corrected as shown below:

Column 14, line 11, please replace “5” with -- 4 --.

Signed and Sealed this

First Day of May, 2007

JON W. DUDAS
*Director of the United States Patent and Trademark Office*

UNITED STATES PATENT AND TRADEMARK OFFICE

CERTIFICATE OF CORRECTION

PATENT NO. : 7,179,546 B1
APPLICATION NO. : 11/004202
DATED : February 20, 2007

INVENTOR(S) : Guocon Chen

It is certified that error appears in the above-identified patent and that said Letters Patent is hereby corrected as shown below:

Column 14, line 11, please replace "5" with -- 4 --.

This certificate supersedes Certificate of Correction issued May 1, 2007.

Signed and Sealed this

Twenty-second Day of May, 2007

JON W. DUDAS
*Director of the United States Patent and Trademark Office*